US 6,651,482 B1

(12) United States Patent
Moffatt et al.

(10) Patent No.: US 6,651,482 B1
(45) Date of Patent: Nov. 25, 2003

(54) APPARATUS AND METHOD FOR VEHICLE ROLLOVER CRASH TESTING

(75) Inventors: Edward Moffatt, Orinda, CA (US); Eddie Cooper, Scottsdale, AZ (US)

(73) Assignee: Exponent, Inc., Menlo Park, CA (US)

( * ) Notice: Subject to any disclaimer, the term of this patent is extended or adjusted under 35 U.S.C. 154(b) by 186 days.

(21) Appl. No.: 09/879,516

(22) Filed: Jun. 12, 2001

Related U.S. Application Data

(60) Provisional application No. 60/256,113, filed on Dec. 15, 2000.

(51) Int. Cl.[7] .................................................. G01M 7/00
(52) U.S. Cl. ..................................................... 73/12.12
(58) Field of Search ........................... 73/12.01, 12.04, 73/12.05, 12.06, 12.07, 12.08, 12.09, 12.11, 12.12, 12.13, 12.14

(56) References Cited

U.S. PATENT DOCUMENTS

| | | | | |
|---|---|---|---|---|
| 5,623,094 A | * | 4/1997 | Song et al. | 73/12.07 |
| 5,635,624 A | * | 6/1997 | Cerny | 73/12.01 |
| 6,035,728 A | * | 3/2000 | Jost | 73/865.3 |
| 6,055,472 A | * | 4/2000 | Breunig et al. | 701/45 |
| 6,332,104 B1 | * | 12/2001 | Brown et al. | 701/1 |
| 6,496,763 B2 | * | 12/2002 | Griessbach | 701/45 |

* cited by examiner

Primary Examiner—Max Noori

(57) ABSTRACT

An apparatus 10 for measuring and/or analyzing the rollover characteristics of a vehicle 12. Apparatus 10 includes a controller 14, a selectively movable test fixture assembly 16, a truck or towing vehicle 18 which is coupled to trailer assembly 16 and which selectively tows or drives assembly 16, several cameras 22, 24, 26 and 28, and a user interface 30. Vehicle 12 is attached to test fixture 16, and user interface 30 is used to activate motor assembly 36 which selectively rotates vehicle 12 to a desired roll angle 90 relative to the ground surface 43. Once vehicle 12 is correctly positioned, an operator drives truck 18 at a predetermined and desired speed. Controller 14 generates release signals to exploding bolts 86, 88, which simultaneously explode, thereby releasing vehicle 12 from frame 32. In this manner, apparatus 10 allows the drop height and the translational and vertical velocity of a vehicle to be selectively controlled, adjusted and repeated from test to test, and provides controllable and predictable roof-to-ground impacts.

23 Claims, 4 Drawing Sheets

APPARATUS AND METHOD FOR VEHICLE ROLLOVER CRASH TESTING

This application claims the benefit of Provisional Application Ser. No. 60/256,113 filed Dec. 15, 2000.

FIELD OF THE INVENTION

This invention relates to an apparatus and a method for vehicle rollover crash testing and more particularly, to an apparatus and a method which is adapted to provide consistent, full-scale and accurate replications of vehicle rollovers and which allows the roll rate and the translational and vertical velocity of a vehicle to be selectively controlled, adjusted and repeated from test to test.

BACKGROUND OF THE INVENTION

It is desirable to conduct crash tests of vehicle rollovers in order to gain a better understanding of the vehicle's characteristics and the interaction between the vehicle and its occupants during such instances. For example and without limitation, understanding a vehicle's characteristics and vehicle/occupant interaction during such events allows the vehicle to be made safer. Particularly, the information acquired from such tests or analyses can be used to optimize the vehicle's structure or geometry, the number and/or types of safety devices used within the vehicle, and/or the timing of the deployment of safety devices in order to better protect the occupants of the vehicle in such rollover situations.

Efforts have been made to determine and/or analyze a vehicle's characteristics and vehicle/occupant interaction during rollover events. For example and without limitation, prior methods have included the use of a moving dolly or other device to launch the vehicle into a roll, rolling the vehicle down an incline, and attempted "tripping" of the vehicle. One drawback associated with these prior efforts is that they do not allow for the rollover crash tests to occur in a controlled and consistent manner, and more specifically, do not allow the roof-to-ground impacts which occur during these rollover simulations to be repeatable in a controlled and consistent manner. Particularly, variations associated with tire-to-dolly and tire/wheel-to-ground interactions, which occur early in conventional rollover tests, tend to produce unpredictable and unrepeatable roof-to-ground impacts. Despite controlled testing conditions, these prior methods and apparatuses cause significant variations in vehicle rollover motions and impacts. Hence, although these prior methods and systems provide useful data, it is difficult to quantify or compare rollover performance of specific impacts with these prior methods and systems since they lack "repeatability".

Applicants' invention addresses these drawbacks and provides a new and improved method and an apparatus for vehicle rollover testing.

SUMMURY OF THE INVENTION

A first advantage of the invention is that it provides an apparatus and a method for vehicle rollover crash testing which overcomes at least some of the previously delineated drawbacks of the prior systems, devices and/or methods.

A second advantage of the invention is that it provides an apparatus and a method for vehicle rollover crash testing which allows a particular rollover impact situation to be accurately and consistently replicated.

A third advantage of the invention is that it provides an apparatus and a method for vehicle rollover crash testing which provides a full and reasonable replication of a vehicle rollover.

A fourth advantage of the invention is that it provides for vehicle rollover testing which allows certain roof-to-ground impact attributes, such as velocity, roll velocity, angle and drop height, to be selectively controlled and adjusted prior to the test, thereby providing repeatability from test to test.

According to one aspect of the present invention, an apparatus is provided for performing rollover testing of a vehicle. The apparatus includes a test fixture assembly on which the vehicle is mounted and which is selectively movable at a certain velocity; and at least one selectively releasable attachment member which is effective to couple the vehicle to the test fixture assembly and to selectively release the vehicle from the moving test fixture assembly, thereby testing a rollover crash event.

According to a second aspect of the present invention a method is provided for full scale testing a rollover event for a vehicle. The method includes the steps of: suspending the vehicle from a movable fixture at a predetermined yaw and pitch angular position; moving the fixture at a predetermined velocity; and releasing the vehicle from the fixture, thereby causing the vehicle to impact the ground in a repeatable rollover fashion.

Further objects, features, and advantages of the invention will become apparent from the following detailed description of the preferred embodiment of the invention and by reference to the following drawings.

DETAILED DESCRIPTION OF THE PREFERRED EMBODIMENT OF THE INVENTION

Figure 1:
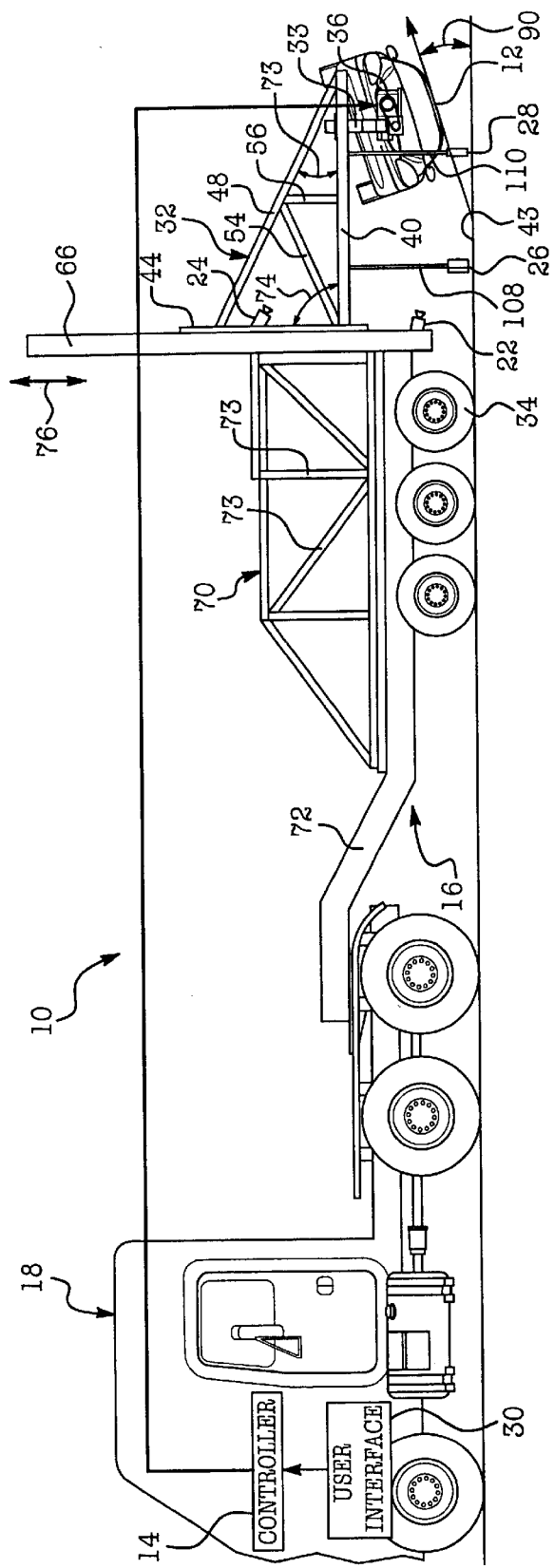
FIG. 1 is a side schematic view of an apparatus for vehicle rollover testing which is made in accordance with the teachings of the preferred embodiment of the invention.

Referring now to FIGS. 1–4, there is shown a system or apparatus 10 for measuring and/or analyzing the rollover characteristics of a vehicle 12 and which is made in accordance with the teachings of the preferred embodiment of the invention. As shown, apparatus 10 includes a controller 14, a test fixture/trailer assembly 16 on which vehicle 12 is selectively and rotatably mounted, a truck or towing vehicle 18 which is coupled to trailer assembly 16 and which selectively tows or drives assembly 16, several cameras 22, 24, 26 and 28, and a user interface 30.

Controller 14 is electrically, physically, and communicatively coupled to test fixture assembly 16 and to user interface 30. As described more fully and completely below, controller 14 controls the operation of test fixture assembly 16 and the position and release of vehicle 12, effective to cause vehicle 12 to replicate certain rollover conditions and/or events in a consistent, repeatable manner.

In the preferred embodiment, controller 14 may include one or more controllers, microcontrollers, microprocessors or integrated circuits which perform one or more of the below-described processes. It should be appreciated that controller 14 may comprise several disparate chips or devices.

Test fixture assembly 16 includes a trailer 72, several wheels 34 which are coupled to trailer 72, a support structure 70 which is attached to trailer 72, a vehicle holding or suspending structure or frame 32, a pair of vehicle attachment assemblies 33, 35 which selectively attach and hold the vehicle 12 to frame 32, and a selectively controllable motor or hydraulic assembly 36 that causes vehicle 12 to be rotated about its longitudinal axis 38 and held in various angular positions.

Vehicle holding frame 32 includes a pair of rails 40, 42 which are horizontally disposed relative to ground surface 43 (e.g., rails 40, 42 are parallel to ground surface 43). Rails 40, 42 are respectively and fixedly coupled to vertical rails 44, 46 in a conventional manner (e.g., by use of conventional welds or fasteners). Frame 32 further includes rails 48, 50 which are coupled to rails 44, 46 and 40, 42, respectively, and which extend at an acute angle 73 relative to rails 40, 42. Rails 48, 50 are respectively and fixedly coupled to rails 40, 42 and to rails 44, 46 in a conventional manner. Rails 44, 46 extend perpendicularly from rails 40, 42 (i.e., at an angle 74 of about 90 degrees). Frame 32 further includes two pairs of cross members 54, 56 which are coupled to rails 40, 48 and 42, 50 in a conventional manner and provide further structural support and rigidity to frame 32. Rails 40 56 are manufactured from a relatively strong and durable material (e.g., steel). Rails 44, 46 are conventionally, slidably and respectively disposed upon and/or coupled to (e.g., by use of conventional clamps, fasteners and/or support pins) vertical pillars 66, 68 which are fixedly attached to trailer 72 and support structure 70. As shown best in FIG. 3, rails 44, 46 can be independently and vertically adjusted and moved in the directions of arrows 76 relative to pillars 66, 68, thereby allowing the drop height 94 and pitch angle 96 (i.e., the angle of the longitudinal axis 38 of the vehicle relative to ground 43) to be selectively adjusted. In this manner, the front of the vehicle 12 can be positioned closer or further from ground 43 relative to the rear of the vehicle 12. It should be appreciated that different types of rail or structural arrangements may be used to form vehicle holding frame 32 and/or to suspend vehicle 12 above ground 43.

Figure 2:
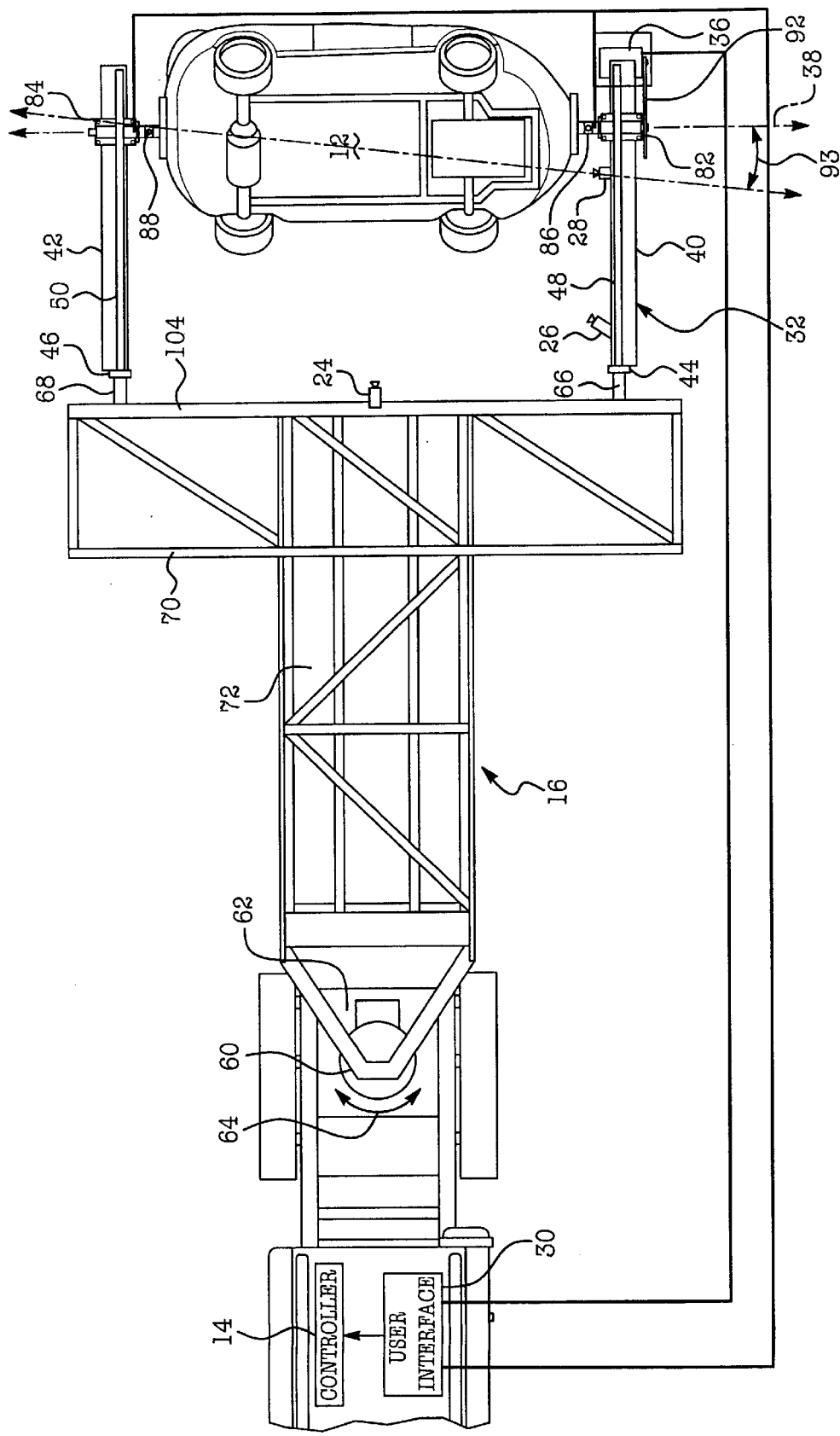
FIG. 2 is a plan view of the apparatus shown in FIG. 1.

Support structure 70 includes several support members or rails 73 which are manufactured from a relatively strong and durable material (e.g., steel) and which are coupled together in a conventional manner (e.g., by welding or by the use of conventional fasteners). Support structure 70 is fixedly coupled to trailer 72 in a conventional manner. Trailer 72 is a conventional semi-trailer including a "hitch" or towing member 60 which rotationally engages a receiving member 62 in the back portion of truck 18 (e.g., member 60 is able to rotate relative to member 62 in the directions of arrows 64), as shown in FIG. 2, thereby allowing truck 18 to selectively tow or move assembly 16. Wheels 34 are conventional wheel assemblies which are coupled to trailer 72 in a conventional manner and which engage ground surface 43, thereby allowing the fixture assembly 16 to be towed by truck 18.

Figure 3:
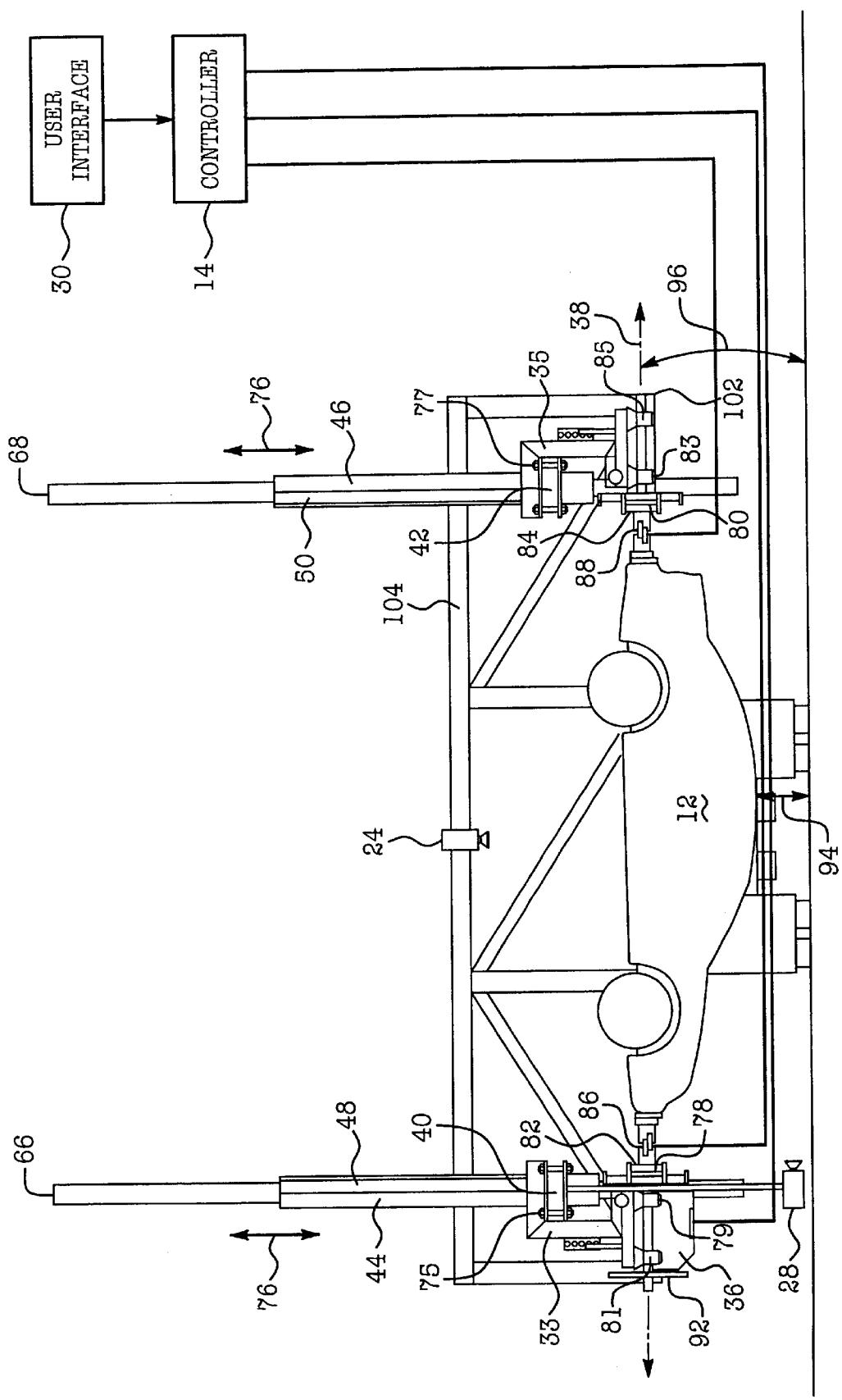
FIG. 3 is a back view of the apparatus shown in FIG. 1.
Figure 4:
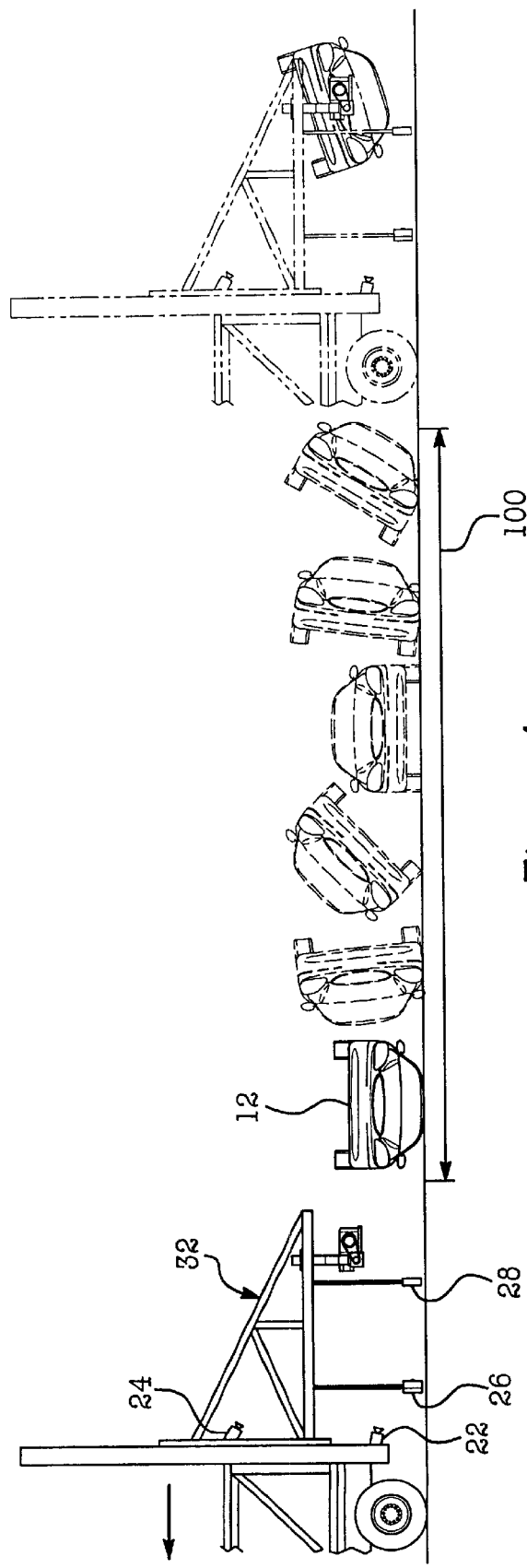
FIG. 4 illustrates the apparatus shown in FIG. 1 being used to test the rollover characteristics of a vehicle.

Referring to FIG. 3, vehicle attachment assemblies 33, 35 are respectively and removably coupled to rails 40, 42 in a conventional manner (e.g., by use of clamp assemblies 75, 77). Assemblies 33, 35 respectively include housings 78, 80 and vehicle attachment or shaft members 82, 84 which are respectively and rotationally disposed within housings 78, 80 and which further extend through and rotationally engage bearing members 79, 81 and 83, 85, respectively. Members 82, 84 are attached to the frame or other structural support member(s) of vehicle 12 by use of selectively activatable, releasable or "exploding" fastener assemblies 86, 88. In the preferred embodiment, selectively releasable fastener assemblies 86, 88 include clamping or fastening members (not shown) which are directly coupled to a portion of the vehicle frame and conventional "exploding" bolts or other selectively activatable or releasable devices which are communicatively coupled to controller 14 and which are effective to immediately and simultaneously release or disengage vehicle 12 from attachment members 82, 84 upon receipt of a control signal from controller 14. In one non-limiting embodiment, the positions of clamps 75, 77 and attachment assemblies 33, 35 can be independently adjusted along the lengths of members 40, 42, thereby altering the position of longitudinal axis 38 and imparting a desired yaw angle upon vehicle 12 (e.g., angle 93, shown in FIG. 2).

Motor assembly 36 is a conventional hydraulic or electric motor and drive assembly which is coupled to attachment assembly 33 in a conventional manner. Motor assembly 36 engages shaft or member 82 in a conventional manner (e.g., by use of a conventional sprocket/gear assembly 92) and selectively causes member 82 to rotate vehicle 12 about its longitudinal axis 38. Controller 14 is communicatively coupled to motor/drive assembly 36 and provides signals to motor/drive assembly 36, effective to cause motor/drive assembly 36 to tilt vehicle 12 at a particular roll angle 90 with respect to ground 43 (i.e., with respect to the horizontal), as shown best in FIG. 1. Particularly, a user may enter the desired roll angle 90 into controller 14 by use of input device 30. Upon receiving the signals from input device 30, controller 14 generates commands to motor/drive assembly 36 to tilt the vehicle in order to achieve the desired roll angle 90. In the preferred embodiment, user interface 30 comprises a conventional display (e.g., a computer monitor) and an input device (e.g., a keyboard).

Cameras 22, 24, 26 and 28 comprise conventional high speed video cameras and are mounted to frame 32 in a conventional manner. Camera 22 is mounted to a lower horizontal support beam 102 which is attached to and/or forms a portion of support frame 70, and camera 24 is mounted to an upper horizontal support beam 104 which is attached to and/or forms a portion of support frame 70. It should be appreciated that cameras 22, 24 may be positioned on other portions of support structure 70 or frame 32, effective to allow the cameras 22, 24 to obtain views at various distances relative to vehicle 12 and ground 43. Cameras 22, 24 are positioned to acquire side images of vehicle 12, images of the motion of any anthropomorphic test devices or "crash test dummies" which may be placed inside vehicle 12, and images of the first roof-to-ground impact which occurs after vehicle 12 is released. Cameras 26, 28 are mounted to rail 40 by use of members 108, 110 which extend downward from rail 40, thereby supporting cameras 26, 28 near ground level. Cameras 26, 28 are positioned to acquire front images of vehicle 12. In the preferred embodiment, additional "off board" cameras (not shown) are disposed around the target drop zone and acquire visual data from various angles relative to vehicle 12.

In operation, vehicle 12 is attached to frame 32 (e.g., to attachment members 82, 84). In the preferred embodiment, prior to attaching vehicle 12 to test fixture 16, the rails 48, 50 are positioned to achieve a desired drop height 94 and pitch angle 96. Assemblies 33, 35 may also be adjusted to provide a desired yaw angle 93. Once vehicle 12 is attached to test fixture 16, user interface 30 is used to selectively rotate vehicle 12 to a desired roll angle 90 relative to ground surface 43. In other alternate embodiments, these steps may be performed in a different order. Once vehicle 12 is correctly positioned, fixture 16 is connected to truck 18, and an operator drives truck 18 at a predetermined and desired speed. In the preferred embodiment, the truck 18 is gradually accelerated to the desired velocity and the vehicle 12 is dropped or released just prior to reaching a targeted landing zone 100, as shown in FIG. 5. Particularly, just prior to reaching zone 100, the operator of truck 18 inputs a release command into controller 14 by use of interface 30. Controller 14 receives the release command and generates release signals to exploding bolts 86, 88, which simultaneously explode, thereby releasing vehicle 12 from frame 32. In timing the release, the operator should consider the distance the vehicle 12 travels as it drops, and in one non-limiting embodiment, controller 14 is effective to calculate this distance based upon the speed of truck 18 and the drop height 94 and to display this distance to the operator by use of interface 30. In this manner, apparatus 10 allows the translational and vertical velocity of a vehicle and the roof-to-ground impact to be selectively controlled, adjusted and repeated from test to test.

In the preferred embodiment, conventional "crash dummies" and sensors are placed in the vehicle 12 to acquire data regarding the rollover characteristics of vehicle 12 and the vehicle/occupant interaction during a rollover event. For example and without limitation, conventional sensors may be used to measure vehicle and dummy loads, strains, deformation, and other vehicle or crash test dummy attributes or characteristics.

In one non-limiting embodiment, motor/drive assembly 36 is used to provide a designated roll rate to the vehicle prior to its release. Particularly, motor/drive assembly 36 is used to impart a rotation to vehicle 12 prior to its release, effective to simulate the airborne phase of a rollover event. In one non-limiting embodiment, motor/drive assembly 36 is effective to impart a roll velocity of up to one revolution per second to vehicle 12.

The present system 10 provides the ability to conduct repeated rollover tests with identical and selectable roof-to-ground impacts. The high speed film sequences obtained from cameras 22–28, which are traveling with the test fixture 16 provide "close-up" views that are not possible in normal rollover testing. Cameras 22–28 not only capture images at initial impact, but also continue to provide useful details of vehicle motion. In one non-limiting embodiment, truck 18 is decelerated at approximately the same speed as the rolling vehicle 12 following its release from fixture 16 to provide further views of the vehicle 12 in motion.

The predictability and controllability of the first roof-to-ground impact provided by the present invention will also allow for unique opportunities for instrumentation placement that are not practical with prior methods. For example and without limitation, due to the difficulty in predicting which part of the roof will strike the ground in prior testing methods and systems, instrumentation disposed at specific vehicle locations is often wasted. With the present system, opportunities for roof accelerometers, pressure sensitive foils, and roof displacement measuring devices allow for improved understanding of the interaction between the vehicle's roof, vehicle occupants and the ground surface.

Improved scientific investigation of the performance of rollover safety devices is likewise facilitated by the various features and repeatable nature of the present test procedures provided by system 10. Furthermore, because system 10 can be used to rotate a vehicle about its center of gravity as it is released, system 10 provides a reasonable simulation of a typical airborne phase of a rollover, in addition to its translational motion and drop features. The occupant containment characteristics attributable to various occupant restraint assemblies, such as seat belts and air bags, can be explored with the present system 10 in the absence of any ground impact (e.g. by selectively moving and rotating the vehicle 12). Moreover, since potential safety devices such as side window nets, air curtains or ejection resistant glazing can be subjected to direct impacts, their crash performance can be further analyzed by incorporating the translation and drop/impact features. In contrast to a stationary inverted drop test, the test procedure employed by system 10 allows the vehicle to continue to roll, enabling investigation of the ejection prevention characteristics of the safety devices after an extremely severe ground impact.

The interaction between the vehicle occupants and the structure and geometry of the vehicle can also be investigated by use of system 10. The effects of vehicle shape and roof strength on roof crush and safety in realistic rollover conditions can be better understood because comparable vehicles with and without added strength can now be subjected to repeatable, realistic rollover roof-to-ground impacts.

It is understood that the various inventions are not limited to the exact construction illustrated and described above, but that these previously delineated inventions may be varied without departing from the scope of the inventions as described in the following claims.

What is claimed is:

1. An apparatus performing rollover crash testing of a vehicle onto a surface, said apparatus comprising:

a test fixture assembly on which said vehicle is mounted above the surface and which is selectively movable at a certain velocity;

at least one selectively releasable attachment member which is effective to couple said vehicle to said test fixture assembly and to selectively release said vehicle from said moving test fixture assembly, thereby causing the vehicle to contact the surface and a rollover crash event to act upon the vehicle: and a device generating rollover test data during the rollover crash event.

2. The apparatus of claim 1 wherein said at least one selectively releasable attachment member comprises exploding bolts.

3. The apparatus of claim 1 further comprising:

a user interface; and a controller which is communicatively connected to said at least one releasable attachment member and said user interface, said controller being effective to receive commands from said user interface and to communicate a signal to said at least one selectively releasable attachment member, said signal being effective to cause said at least one selectively releasable attachment member to release said vehicle from said moving test fixture.

4. The apparatus of claim 1 wherein said test fixture assembly includes a motor assembly which is effective to selectively rotate said vehicle about a longitudinal axis.

5. The apparatus of claim 1 wherein the device comprises a plurality of cameras mounted to said test fixture assembly, said plurality of cameras being effective to acquire images of said vehicle during said rollover crash event.

6. The apparatus of claim 1 further comprising:

a towing vehicle to which said test fixture assembly is connected and which is effective to tow said test fixture assembly at said certain velocity.

7. The apparatus of claim 1 wherein said test fixture assembly is effective to selectively hold said vehicle at a plurality of drop heights.

8. A system for performing a rollover crash test of a vehicle comprising:

a movable fixture upon which said vehicle is mounted;

a pair of selectively activatable releasable attachment members which are effective to selectively and releasably mount said vehicle to said fixture;

a towing vehicle which Is connected to said movable fixture and which is effective to move said fixture at a certain speed;

a controller which is communicatively coupled to said releasable attachment members and which is effective to selectively activate said members once said vehicle reaches said certain speed, thereby releasing said vehicle from said fixture and causing said vehicle to impact the ground in a repeatable rollover manner;

a device generating rollover test data during the rollover crash event.

9. The system of claim 8 further comprising:

a pair of shafts which are each coupled to a unique one of said releasable attachment members, and which are rotationally coupled to said fixture; and a motor assembly which is coupled to a unique one of said pair of shafts and which is effective to selectively rotate said shaft, thereby positioning said vehicle at a desired roll angle.

10. The system of claim 9 wherein said motor assembly is further effective to impart a certain roll rate upon said vehicle.

11. The system of claim 8 wherein said release attachment members comprise exploding bolts.

12. The system of claim 8 wherein said fixture is effective to hold said vehicle at a certain pitch angle and a certain yaw angle.

13. A method for performing rollover crash testing of a vehicle comprising the steps of:

suspending said vehicle from a movable fixture at a predetermined angular position;

moving said fixture at a predetermined velocity;

releasing said vehicle from said fixture, thereby causing said vehicle to rollover;

generating rollover test data during the rollover.

14. The method of claim 13 further comprising the step of:

positioning said vehicle at a predetermined drop height.

15. The method of claim 14 further comprising the step of:

rotating said vehicle prior to releasing said vehicle, effective to impart a predetermined roll rate to said vehicle.

16. The method of claim 14 wherein said fixture is moved by use of a truck.

17. The method of claim 14 wherein said predetermined angular position comprises a roll angle with respect to a ground surface.

18. The method of claim 17 wherein said predetermined angular position further comprises a pitch angle.

19. The method of claim 18 wherein said predetermined angular position further comprises a yaw angle.

20. The method of claim 13 wherein said vehicle is suspended from said fixture by use of exploding bolt assemblies.

21. The apparatus of claim 1 wherein the device comprises a plurality of sensors positioned within the vehicle.

22. The system of claim 8 wherein the device comprises a plurality of sensors positioned within the vehicle.

23. The system of claim 8 wherein the device comprises a plurality of cameras mounted to said test fixture assembly, said plurality of cameras being effective to acquire images of said vehicle during said rollover crash event.

* * * * *